(12) United States Patent
Kannappan

(10) Patent No.: US 8,798,042 B2
(45) Date of Patent: Aug. 5, 2014

(54) PRESENCE BASED TELEPHONY CALL SIGNALING

(71) Applicant: Plantronics, Inc., Santa Cruz, CA (US)

(72) Inventor: Kenneth A Kannappan, Palo Alto, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 13/802,077

(22) Filed: Mar. 13, 2013

(65) Prior Publication Data

US 2013/0208717 A1 Aug. 15, 2013

Related U.S. Application Data

(63) Continuation of application No. 12/393,343, filed on Feb. 26, 2009, now Pat. No. 8,428,053.

(51) Int. Cl.
*H04M 1/60* (2006.01)
*H04L 12/66* (2006.01)
*H04M 1/253* (2006.01)
*H04M 1/57* (2006.01)

(52) U.S. Cl.
CPC .............. *H04M 1/2535* (2013.01); *H04M 1/57* (2013.01); *H04L 12/66* (2013.01); *H04M 1/578* (2013.01); *H04M 2250/12* (2013.01); *H04M 1/6066* (2013.01)
USPC .......................................... 370/356; 370/419

(58) Field of Classification Search
None
See application file for complete search history.

(56) References Cited

U.S. PATENT DOCUMENTS

| 5,712,911 | A | 1/1998 | Her | |
|---|---|---|---|---|
| 6,594,354 | B1 | 7/2003 | Kelly | |
| 6,853,850 | B2 | 2/2005 | Shim et al. | |
| 7,120,238 | B1 | 10/2006 | Bednarz et al. | |
| 8,428,053 | B2 * | 4/2013 | Kannappan | 370/356 |
| 2001/0033647 | A1 * | 10/2001 | Veschi | 379/372 |
| 2005/0063556 | A1 | 3/2005 | McEachen et al. | |
| 2007/0004473 | A1 | 1/2007 | Clark et al. | |
| 2008/0112567 | A1 | 5/2008 | Siegel et al. | |
| 2008/0134278 | A1 | 6/2008 | Al-Karmi | |
| 2008/0260169 | A1 | 10/2008 | Reuss | |
| 2008/0299948 | A1 | 12/2008 | Rosener | |
| 2009/0082062 | A1 * | 3/2009 | Boyaci et al. | 455/557 |
| 2009/0220064 | A1 * | 9/2009 | Gorti et al. | 379/202.01 |
| 2009/0305632 | A1 | 12/2009 | Sarkissian et al. | |
| 2010/0008488 | A1 * | 1/2010 | Bear et al. | 379/207.02 |
| 2010/0020998 | A1 | 1/2010 | Brown et al. | |
| 2010/0066821 | A1 | 3/2010 | Rosener | |
| 2011/0230239 | A1 | 9/2011 | Ueda et al. | |
| 2011/0314185 | A1 | 12/2011 | Conroy et al. | |
| 2012/0122435 | A1 * | 5/2012 | Sarkissian et al. | 455/414.1 |

* cited by examiner

*Primary Examiner* — Hassan Phillips
*Assistant Examiner* — Duc Duong
(74) *Attorney, Agent, or Firm* — Chuang Intellectual Property Law

(57) ABSTRACT

Methods and systems for presence based telephony call signaling are presented. An incoming call is received at a computer, where the computer includes a computer loudspeaker and computer display. A headset donned state or a headset doffed state is identified for a wireless headset, where the wireless headset includes a headset speaker and headset output user interface. A proximity between the wireless headset and the computer is determined. An incoming call notification is output to the headset speaker, the headset output user interface, the computer loudspeaker, or the computer display responsive to identifying the headset donned state or headset doffed state and determining the headset proximity.

26 Claims, 12 Drawing Sheets

PRESENCE BASED TELEPHONY CALL SIGNALING

CROSS-REFERENCE TO RELATED APPLICATIONS

This application is a continuation of U.S. Utility application Ser. No. 12/393,343, filed Feb. 26, 2009, entitled "Presence Based Telephony Call Signally," which is incorporated herein by reference in its entirety for all purposes.

BACKGROUND OF THE INVENTION

The use of Voice over Internet Protocol (VoIP) is a fast growing trend in the telephony industry, displacing circuit switch analog and digital telecommunications systems. In VoIP, analog speech signals received from an audio source are digitized, compressed, and translated into Internet Protocol (IP) data packets for transmission over an IP data network such as the Internet. Benefits of VoIP include cost savings and new communications applications. For example, VoIP can be used to bypass the toll structure imposed by the service providers that operate the public switched telephone network (PSTN) or used to embed voice mail messages into user e-mail.

A VoIP application running on a computer is often referred to as a "softphone", "VoIP telephony application", or a "VoIP phone". In a typical configuration, a wired or wireless headset connected to the computer is used in conjunction with the softphone to receive and transmit speech. In the prior art, softphones indicate incoming calls by displaying an icon on the computer display and outputting an audio tone audible through the headset speaker.

However, incoming call notifications are often missed by users of softphones. As the use of computer-based softphones increases, there is a need for improved methods and systems for notifying users of incoming softphone calls.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
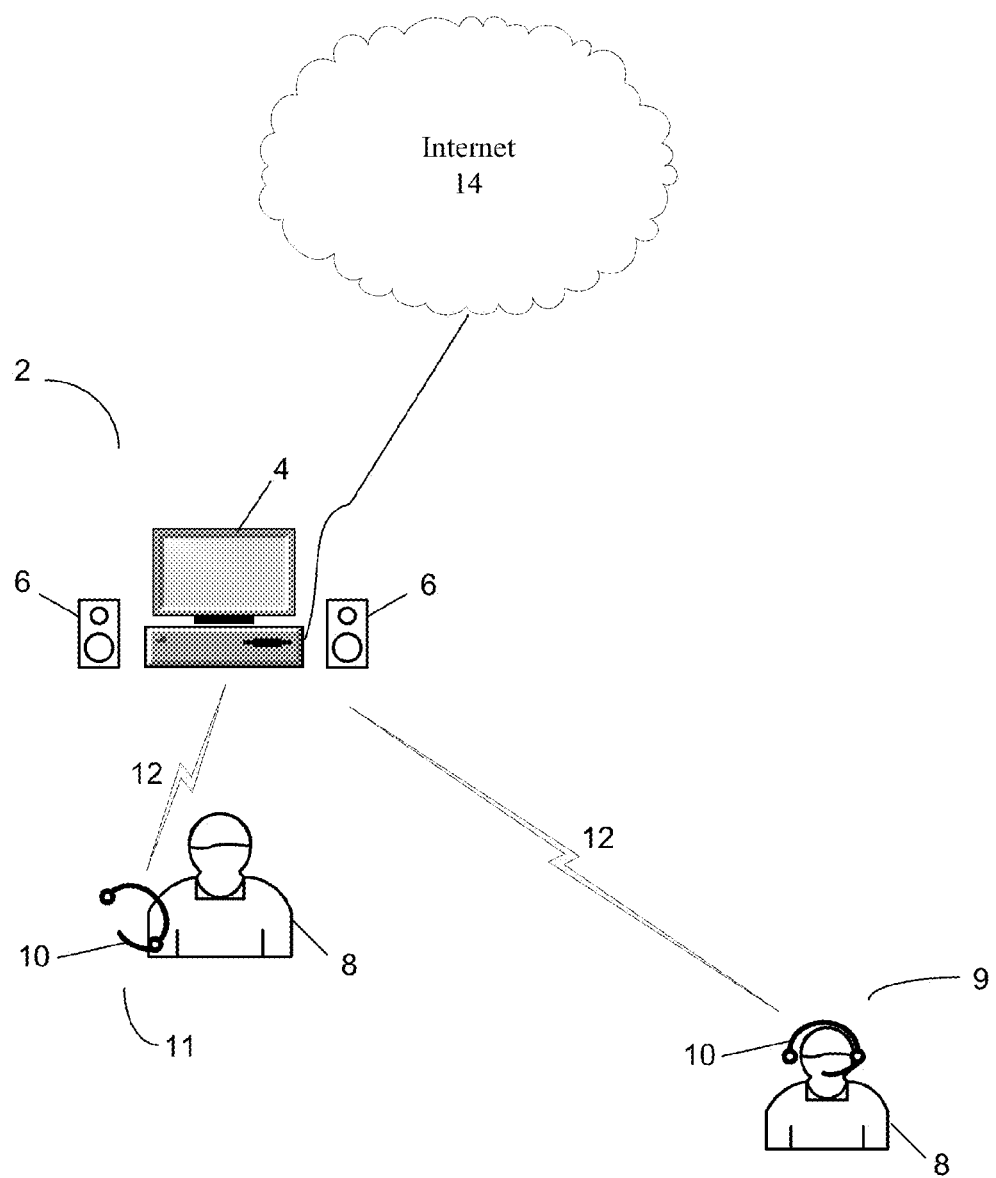
FIG. 1 illustrates a system for presence based telephony call signaling in one example.

Methods and apparatuses for presence based telephony call signaling are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

There is a need for improved methods and systems for notifying softphone users of incoming calls. Due to the nature of headsets, headset audio is rarely audible when the headset is not being worn. If the user is at his desk but not looking at the screen and not wearing his headset, incoming softphone calls can be easily missed since both the visual and audio cues fail to attract the user's attention. Current call notification methods do not work well if the headset is in the user's pocket or the user is in a crowded or noisy location.

The term presence generally refers to information about a user's ability or willingness to communicate, and thus is useful in determining an appropriate signaling method to inform a user of an incoming softphone call. As applied to the field of headsets, presence information may include, for example, whether the headset is being worn by the user, the proximity of the user to the computer running the softphone application (also referred to as the base station), other usage information related to the headset, and whether the user desires to be called. The proximity of the user to the computer running the softphone application is particularly useful presence information in that it indicates whether a user is within audio range to hear an alarm, visual range to see a display, or simply whether the user is in their immediate work area.

In one example, a system and method are described which detect a headset user's position and whether the headset is worn over or on the ear (referred to herein as a "donned" state) such that the user can hear audio output through the headset speaker, or not worn over the ear (referred to herein as a "doffed" or "undonned" state). Based upon the user's position and headset worn state, when a softphone call is received at a computer an incoming call notification is directed to the computer speakers or the headset. In this manner, the computer speakers are utilized for call notification in addition to typical non-telephony applications such as music output.

The headset worn state and proximity information can be transmitted from the headset to the computer periodically and/or in response to a status request from the computer. Alternatively, the computer can determine the headset worn state and proximity. Upon receipt of an incoming softphone call, the computer checks or determines the state of the headset. If the headset is in a donned state, an incoming call notification is sent to the headset to be output through the headset speaker. The incoming call notification may, for example, be a distinctive tone or tones or a verbal message.

If the headset state is indicated as doffed, the computer checks or determines the proximity of the headset to the computer. Proximity can be determined, for example, using Received Signal Strength Indication (RSSI), radio frequency identification (RFID), Bluetooth, infra-red, or other suitable range-finding methods. If the user is indicated to be within a pre-determined range of the computer, the incoming call notification is sent to the computer speakers. If necessary, any audio currently being output at the computer speakers is paused or muted. The incoming call notification may, for example, be a distinctive tone or tones or a verbal message. In one example, the verbal message may include the identity of the caller, thereby assisting the user in determining whether or not to interrupt his current activity to take the call. A visual call notification may also be output at the computer display, which may include caller identification information. If the headset is detected to be outside the pre-determined range, the incoming call notification is directed to the user's headset. A headset display may also display the identity of the incoming caller. In this manner, an improved signaling method is used to notify a softphone user of an incoming call.

In one example, a system for VoIP telephony call notification includes a wireless headset and a computer. The wireless headset includes a headset wireless transceiver, a donned or doffed detector, a headset speaker, and a headset output user interface having a visual indicator or a vibrate indicator. The computer includes a network interface, a computer wireless transceiver operable to communicate with the headset wireless transceiver, a computer loudspeaker, a computer display, a processor, and a memory.

The computer memory stores a VoIP softphone application having instructions which when executed by the processor cause the computer to receive an incoming call on the network interface. The memory also stores a headset proximity detection application having instructions which when executed by the processor cause the computer to identify a headset proximity of the wireless headset in relation to the computer. The memory further includes a user call notification application having instructions which when executed by the processor cause the computer to output an incoming call notification to the headset speaker, the headset output user interface, the computer loudspeaker, or the computer display responsive to the headset proximity and an identified headset donned state or headset doffed state.

In one example, a method for VoIP telephony call notification is presented or a computer readable storage medium storing instructions that when executed by a computer cause the computer to perform a method for VoIP telephony call notification is presented. The method includes receiving an incoming call at a VoIP telephony application in operation at a computer, where the computer includes a computer loudspeaker and computer display. The method further includes identifying a headset donned state or a headset doffed state for a wireless headset associated with the computer, where the wireless headset includes a headset speaker and headset output user interface. A proximity between the wireless headset and the computer is determined. The method further includes outputting an incoming call notification to the headset speaker, the headset output user interface, the computer loudspeaker, or the computer display responsive to identifying the headset donned state or headset doffed state and determining the headset proximity.

In one example, a further method for VoIP telephony call notification is presented or a computer readable storage medium storing instructions that when executed by a computer cause the computer to perform a method for VoIP telephony call notification is presented. The method includes receiving an incoming call at a VoIP telephony application in operation at a computer, where the computer includes a computer loudspeaker and computer display. The method further includes identifying a headset donned state or a headset doffed state for a wireless headset associated with the computer, where the wireless headset comprising a headset speaker and headset output user interface. A proximity between the wireless headset and the computer is determined. The method further includes outputting a first incoming call notification to the computer loudspeaker or the computer display responsive to identifying a headset doffed state and determining the proximity to be within a pre-determined range. The method includes outputting a second incoming call notification to the headset speaker responsive to identifying a headset donned state and determining the proximity to be within a pre-determined range. The method further includes outputting a third incoming call notification to the headset output user interface responsive to identifying a headset doffed state and determining the proximity to be outside a pre-determined range.

FIG. 1 illustrates a system for telephony call signaling in one example. The system includes a wireless headset 10 and a computer 2 (also referred to herein as a "PC" for convenience, though computer 2 may be any type of computing device) connected to Internet 14. Computer 2 includes loudspeakers 6 and a display 4. Wireless headset 10 and computer 2 are capable of wireless communications therebetween over a wireless communication link 12. As illustrated in FIG. 1, a user 8 may be either wearing wireless headset 10 in a donned position 9 or the headset may be in a doffed position 11. For example, when the headset 10 is in a doffed position 11, it may be carried by user 8. As illustrated in FIG. 1, user 8 may be located at a varying proximity from computer 2.

Figure 2:
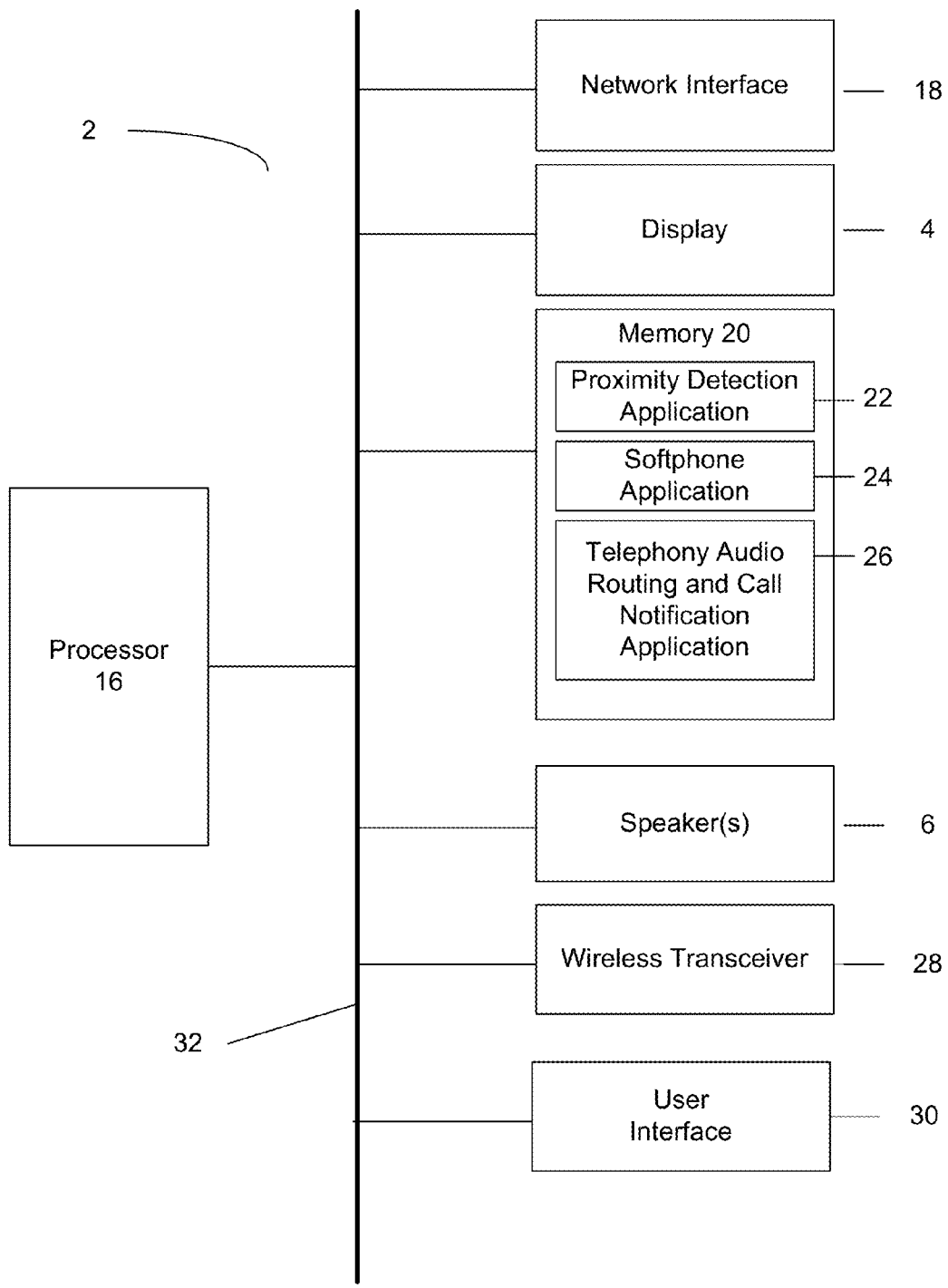
FIG. 2 illustrates a simplified diagram of a computer having a telephony audio routing and call notification application in one example.

FIG. 2 illustrates a computer 2 having a telephony audio routing and call notification application 26 in one example. Computer 2 includes a processor 16 operably coupled via a bus 32 to a network interface 18, a wireless transceiver 28 operable to communicate with a headset wireless transceiver, loudspeakers 6, a display 4, a memory 20, and a user interface 30. Computer 2 may, for example, be a desktop PC or notebook computer.

Memory 20 stores a VoIP softphone application 24 having instructions which when executed by the processor 16 cause the computer 2 to receive an incoming call on the network interface 18. The memory 20 also stores a headset proximity detection application 22 having instructions which when executed by the processor cause the computer to identify a headset proximity of the wireless headset 10 in relation to the computer 2. The memory 20 further includes the telephony audio routing and call notification application 26 having instructions which when executed by the processor 16 cause the computer 2 to output an incoming call notification to a headset speaker, a headset output user interface, the computer loudspeakers 6, or the computer display 4 responsive to the headset proximity and an identified headset donned state or headset doffed state. Although illustrated separately in FIG. 2, in further examples proximity detection application 22, softphone application 24, or telephony audio routing and call notification application 26 may be integrated into a single application.

The proximity detection application 22 may receive and process proximity information characterizing the proximity of the headset 10 to the computer 2. The proximity information may include or may be determined by measuring strengths of signals received (i.e., RSSI) by the headset 10 or by the computer 2. A detector or sensor in the headset 10 may be configured to collect data characterizing proximity of the headset 10 relative to the computer 2. For example, the headset 10 may include an accelerometer operable to measure the proximity information. Further details regarding the use of accelerometers, and in particular tri-axis linear accelerometers, to determine proximity can be found in the commonly assigned and co-pending U.S. patent application entitled "Headset-Derived Real-Time Presence and Communication Systems and Methods", application Ser. No. 11/697,087, which was filed on Apr. 5, 2007, and which is hereby incorporated into this disclosure by reference for all purposes. The proximity information may also be determined using radio frequency identification (RFID).

In one example, the network interface 18 is a wireless transceiver and accompanying antenna for communications with a wireless router or access point. For example, the network interface 18 can be a Bluetooth or 802.11 transceiver. In a further example, network interface 18 is a wired interface, such as that an Ethernet jack used to connect to the Internet or a local area network. In one example, wireless transceiver 28 is a Bluetooth or 802.11 transceiver capable of wireless communication with a corresponding wireless transceiver at the wireless headset 10.

Processor 16 allows for processing data, including managing user presence information related to proximity and headset donned and doffed status, and receiving incoming calls over network interface 18. Processor 16 may include a variety of processors (e.g., digital signal processors), and may be a conventional CPU.

Memory 20 may include a variety of memories, and in one example may include RAM, ROM, flash memory, a hard drive, an optical drive, or a combination thereof. Memory 20 may further include separate memory structures or a single integrated memory structure.

Figure 3:
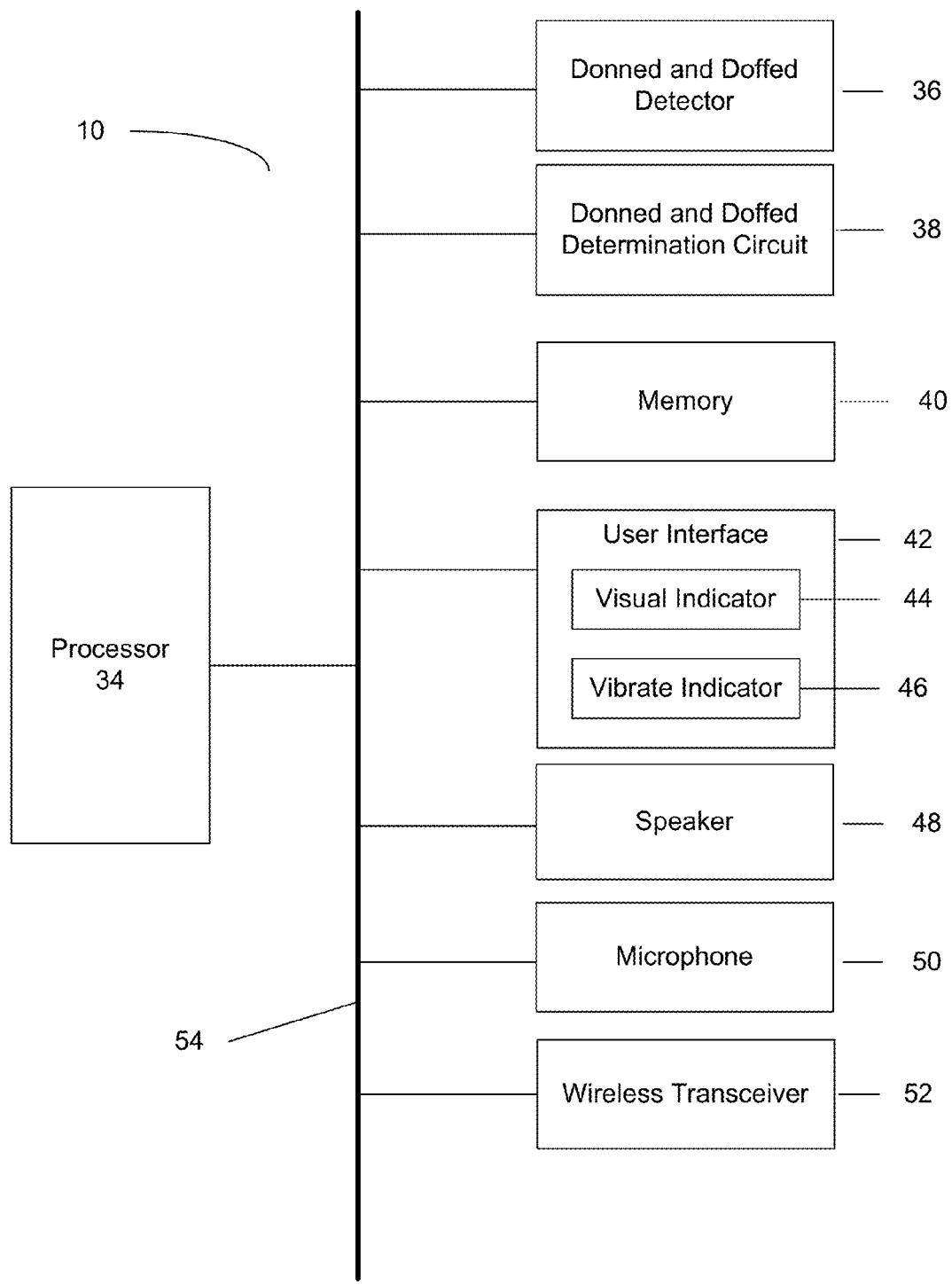
FIG. 3 illustrates a simplified diagram of a wireless headset having a donned and doffed detector in one example.

FIG. 3 illustrates a wireless headset 10 having a donned and doffed detector 36 in one example. The wireless headset 10 includes a processor 34 operably coupled to the donned or doffed detector 36, a donned and doffed determination circuit 38, a memory 40, a user interface 42, a speaker 48, a microphone 50, and a wireless transceiver 52. Wireless transceiver 52 may, for example, be a Bluetooth transceiver.

User interface 42 includes interfaces to receive input from the user and interfaces to output information to the user. For example, the headset output user interface may include a visual indicator 44 or a vibrate indicator 46. In one example, the visual indicator 44 is a LCD display device or LED device. In one example, the vibrate indicator 46 is a vibrate motor integrated with the wireless headset. The headset output user interface may also be an interface adapted to signal a vibrate motor coupled to the headset. For example, a vibrate motor may be coupled to the wireless headset 10 by placing the wireless headset 10 in a charge pocket having a vibrate motor where the charge pocket includes electrical contacts configured to electrically connect to the inserted headset having corresponding interface electrical contacts. The headset interface electrical contacts may be used to transmit a call notification signal to the vibrate motor. Further details of use of wireless headsets with charge pockets having a vibrate motor can be found the commonly assigned and copending U.S. patent application entitled "Headset Charging System with Interchangeable Charge Devices", application Ser. No. 11/351,489, which was filed on Feb. 2, 2006, and which is hereby incorporated into this disclosure by reference for all purposes. The charge pocket is utilized to recharge the headset battery via a charge pocket battery or A/C adapter, and may also utilize LEDs such that the call notification is output as a flashing light or other visual indicator.

There are various types of sensors and detectors which can be employed as donned and doffed detector 36 to determine whether the headset 10 is donned or doffed. Techniques that can be used to determine whether the headset is donned or doffed include, but are not limited to, utilizing one or more of the following sensors and detectors integrated in the headset 10 and/or disposed on or within one or more of the headphones of the headset 10: a thermal or infrared sensor, skin resistivity sensor, capacitive touch sensor, inductive proximity sensor, magnetic sensor, piezoelectric-based sensor, and motion detector. Further details regarding these sensors and detectors can be found in the commonly assigned and co-pending U.S. patent application entitled "Donned and Doffed Headset State Detection", application Ser. No. 11/542,385, which was filed on Oct. 2, 2006, and which is hereby incorporated into this disclosure by reference for all purposes.

The output of donned and doffed detector 36 is provided to donned and doffed determination circuit 38 for determining whether the output of donned and doffed detector 36 corresponds to a donned state or a doffed state. Although illustrated separately, donned and doffed determination circuit 38 may be an application residing in memory 40.

Processor 34 allows for processing data, including managing donned and doffed data from donned and doffed detector 36, and receiving incoming call notifications over wireless transceiver 52. Processor 34 may include a variety of processors (e.g., digital signal processors), and may be a conventional CPU. Memory 40 may include a variety of memories, and in one example includes RAM, ROM, flash memory, or a combination thereof. Memory 40 may include separate memory structures or a single integrated memory structure.

Referring to FIGS. 1-3, in operation, an incoming call is received at a VoIP softphone application 24 executing at computer 2. A headset donned state or a headset doffed state for wireless headset 10 is determined. In addition, a proximity between the wireless headset 10 and the computer 2 is determined. Based upon the determined donned or doffed state of wireless headset 10 and its proximity to computer 2, an incoming call notification responsive to the incoming call is output by telephony audio routing and call notification application 26 to one or more of the headset speaker 48, the headset user interface 42, the computer loudspeakers 6, or the computer display 4.

In one example, the proximity information is used to determine a NEAR/FAR binary state, namely either a closer proximity (referred to herein as a "near" or "NEAR" state) or relatively farther proximity (referred to herein as a "far" or "FAR" state), with the threshold between the two states set by the proximity detection application 22. The terms "status" and "state" may be used interchangeably herein. The precise distance defined by a NEAR state or FAR state may be varied depending on the particular system configuration. In a further example, the proximity determination is more refined than a binary NEAR/FAR determination, providing a relative or absolute distance between the headset 10 and computer 2.

Referring to FIGS. 4-8, a proximity boundary 56 establishes a range from computer 2 below which headset 10 is considered to be in a NEAR state 80 and beyond which headset 10 is considered to be in a FAR state 82. In one example, computer 2 utilizes RSSI values measured at an antenna at computer 2 and/or an antenna at headset 10. In a further example, antenna diversity at either computer 2 and/or headset 10 is utilized to measure multiple RSSI values to determine NEAR state 80 or FAR state 82. Further details regarding proximity detection using antenna diversity and RSSI can be found in the commonly assigned and co-pending U.S. patent application entitled "Antenna Diversity to Improve Proximity Detection using RSSI", application Ser. No. 12/338,876, which was filed on Dec. 18, 2008, and which is hereby incorporated into this disclosure by reference for all purposes. Proximity boundary 56 is a pre-determined range from computer 2, and may depend upon a particular application or user preference.

Figure 4:
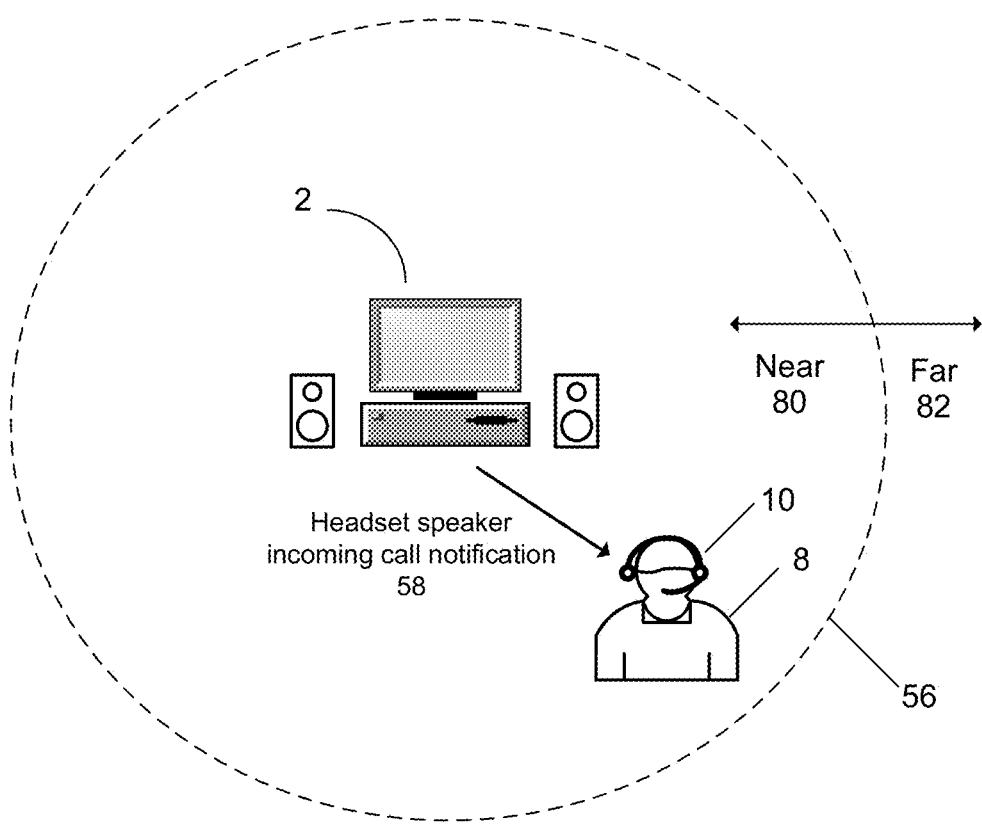
FIG. 4 illustrates an incoming call notification in one usage scenario.

FIG. 4 illustrates an incoming call notification in one usage scenario 400. In usage scenario 400, a user 8 having a donned headset 10 is within proximity boundary 56. Upon receiving an incoming VoIP call, computer 2 sends a headset speaker incoming call notification 58 to headset 10 which is output through the headset speaker.

Figure 5:
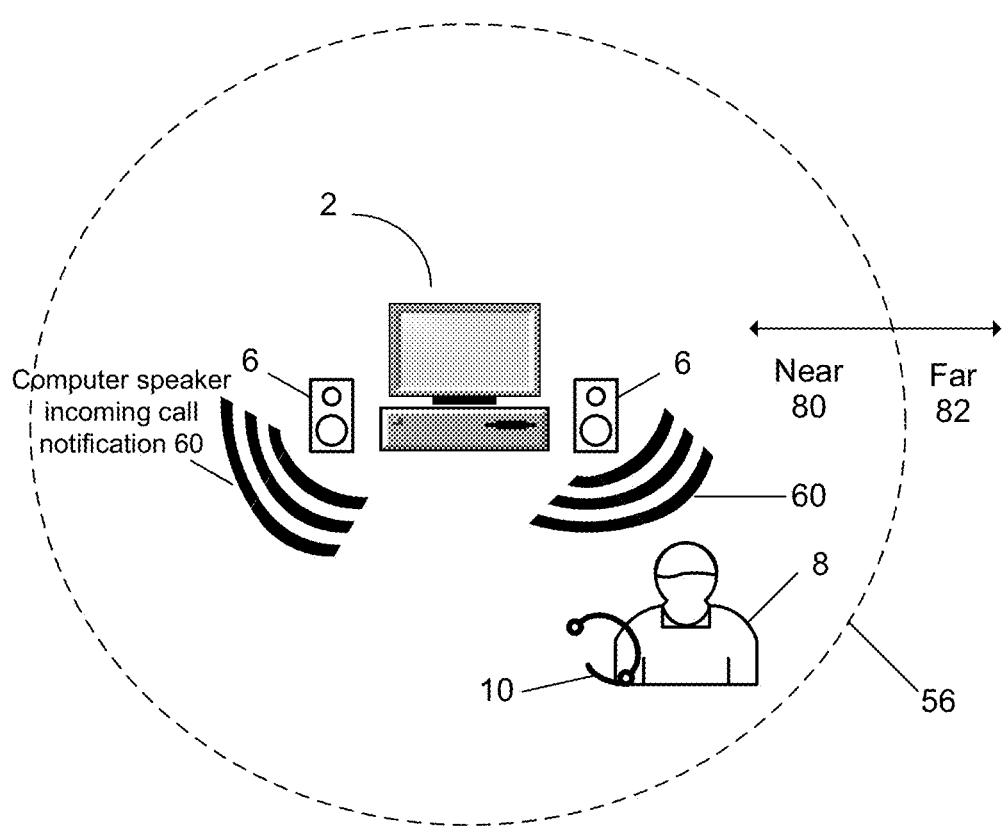
FIG. 5 illustrates an incoming call notification in a second usage scenario.

FIG. 5 illustrates an incoming call notification in a usage scenario 500. In usage scenario 500, a user 8 carrying a doffed headset 10 is within proximity boundary 56. Upon receiving an incoming VoIP call, computer 2 outputs through loudspeakers 6 a computer speaker incoming call notification 60.

Figure 6:
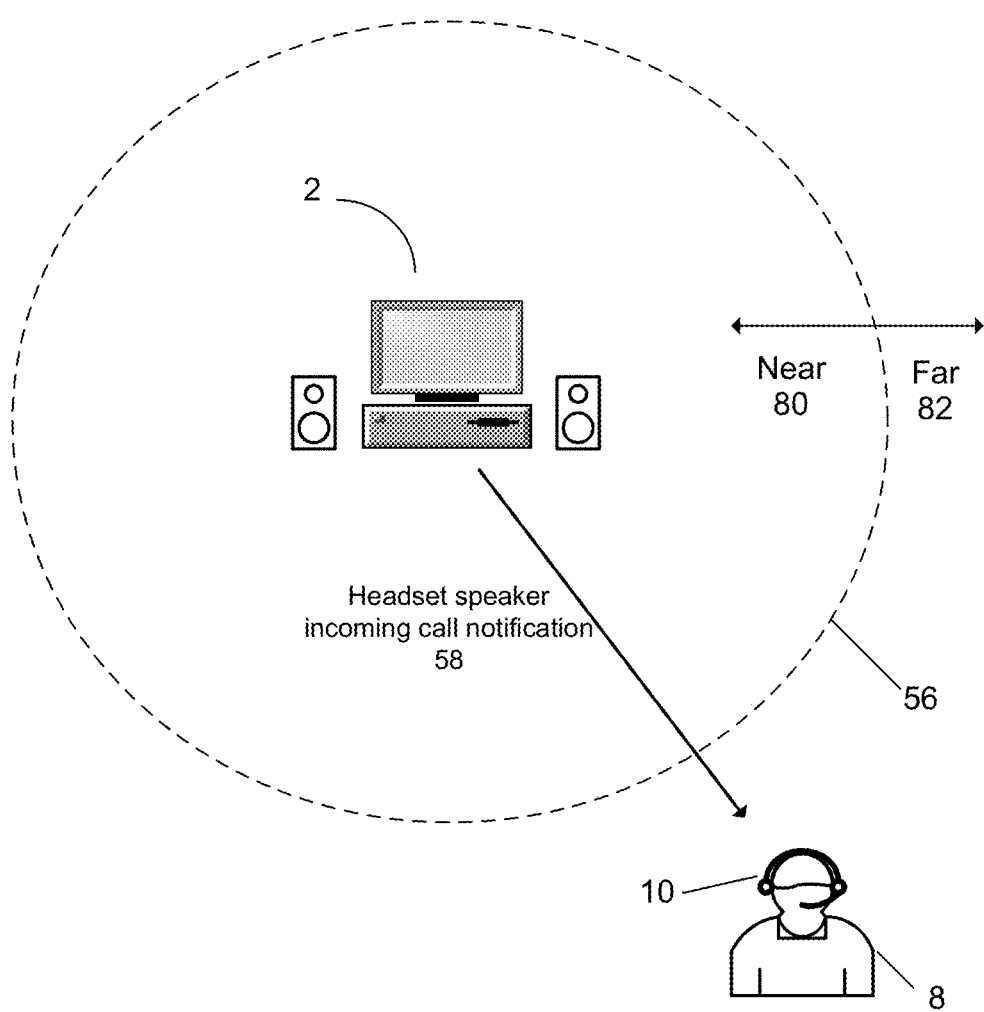
FIG. 6 illustrates an incoming call notification in a third usage scenario.

FIG. 6 illustrates an incoming call notification in a usage scenario 600. In usage scenario 600, a user 8 having a donned headset 10 is outside proximity boundary 56. Upon receiving an incoming VoIP call, computer 2 sends a headset speaker incoming call notification 58 to headset 10 which is output through the headset speaker.

Figure 7:
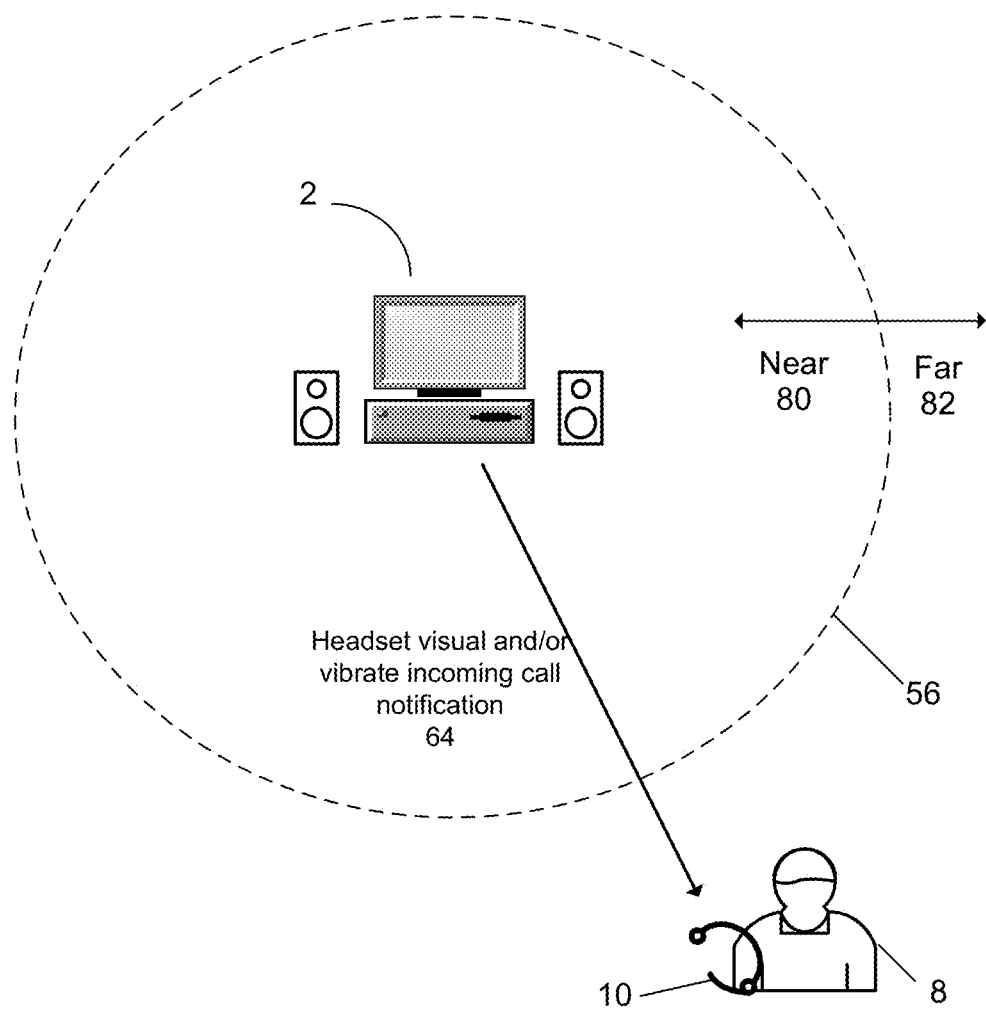
FIG. 7 illustrates an incoming call notification in a fourth usage scenario.

FIG. 7 illustrates an incoming call notification in a usage scenario 700. In usage scenario 700, a user 8 carrying a doffed headset 10 is outside proximity boundary 56. Upon receiving an incoming VoIP call, computer 2 sends a headset visual and/or vibrate incoming call notification 64 to headset 10 which is output at the headset visual and/or vibrate indicator. In one example, incoming call notification 64 is either a visual incoming call notification or a vibrate incoming call notification determined by computer 2. In a further example, incoming call notification 64 is a generic incoming call notification which the headset 10 outputs as either a visual or vibrate indictor depending upon headset settings.

Figure 8:
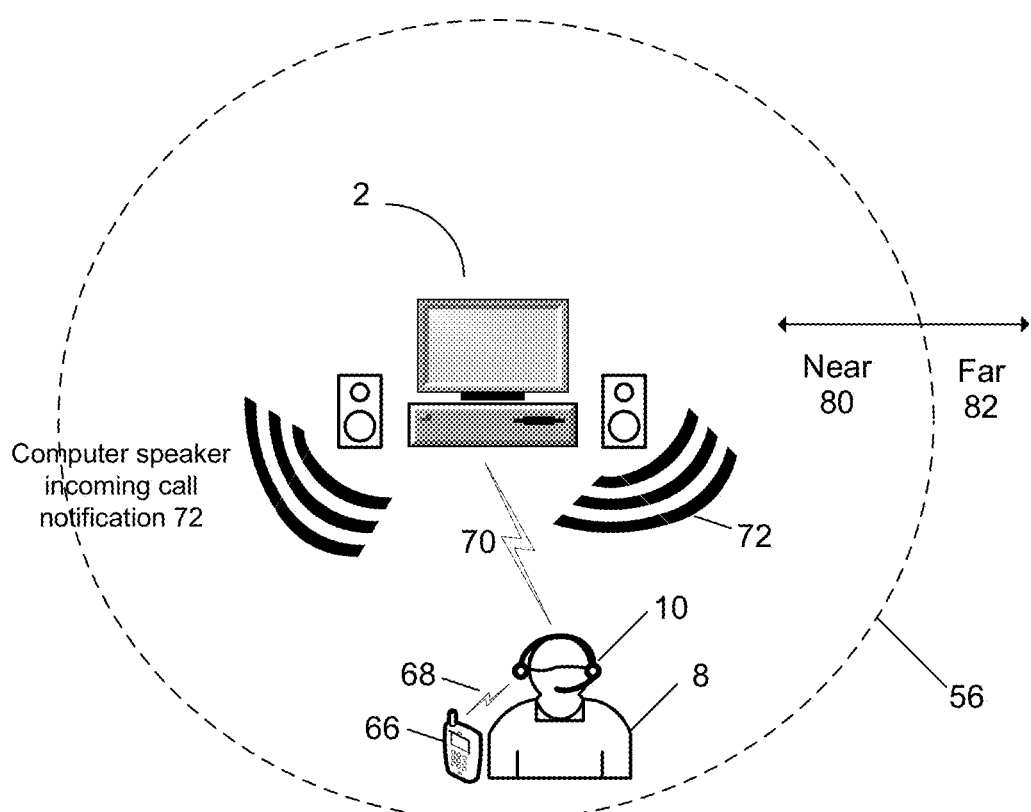
FIG. 8 illustrates an incoming call notification in a fifth usage scenario.

FIG. 8 illustrates an incoming call notification in a usage scenario 800. In usage scenario 800, a user 8 having a donned headset 10 is on a mobile phone call using a mobile phone 66. In usage scenario 800, user 8 having a donned headset 10 is within proximity boundary 56. Headset 10 is capable of forming a wireless communication link 70 with computer 2 and a wireless communication link 68 with mobile phone 66. For example, headset 10 may be a Bluetooth headset operating in multipoint mode. User 8 is utilizing donned headset 10 for voice communications during the mobile phone call via the wireless communication link 68 between headset 10 and mobile phone 66. Upon receiving an incoming VoIP call, computer 2 outputs through loudspeakers 6 a computer speaker incoming call notification 72.

In further examples, once computer 2 determines an incoming call notification is to be sent to headset 10 as opposed to output at the computer speakers, a generic incoming call notification is sent to headset 10. The headset 10 receives the generic incoming call notification from computer 2 and determines the appropriate output user interface to notify the user. If donned, the headset 10 may output an audio notification through the headset speaker. If doffed, the headset 10 may automatically enter a vibrate mode and/or visual indicator mode. The headset user may also manually select the receiving mode as either visual notification, vibrate notification, or audio notification.

Figure 9:
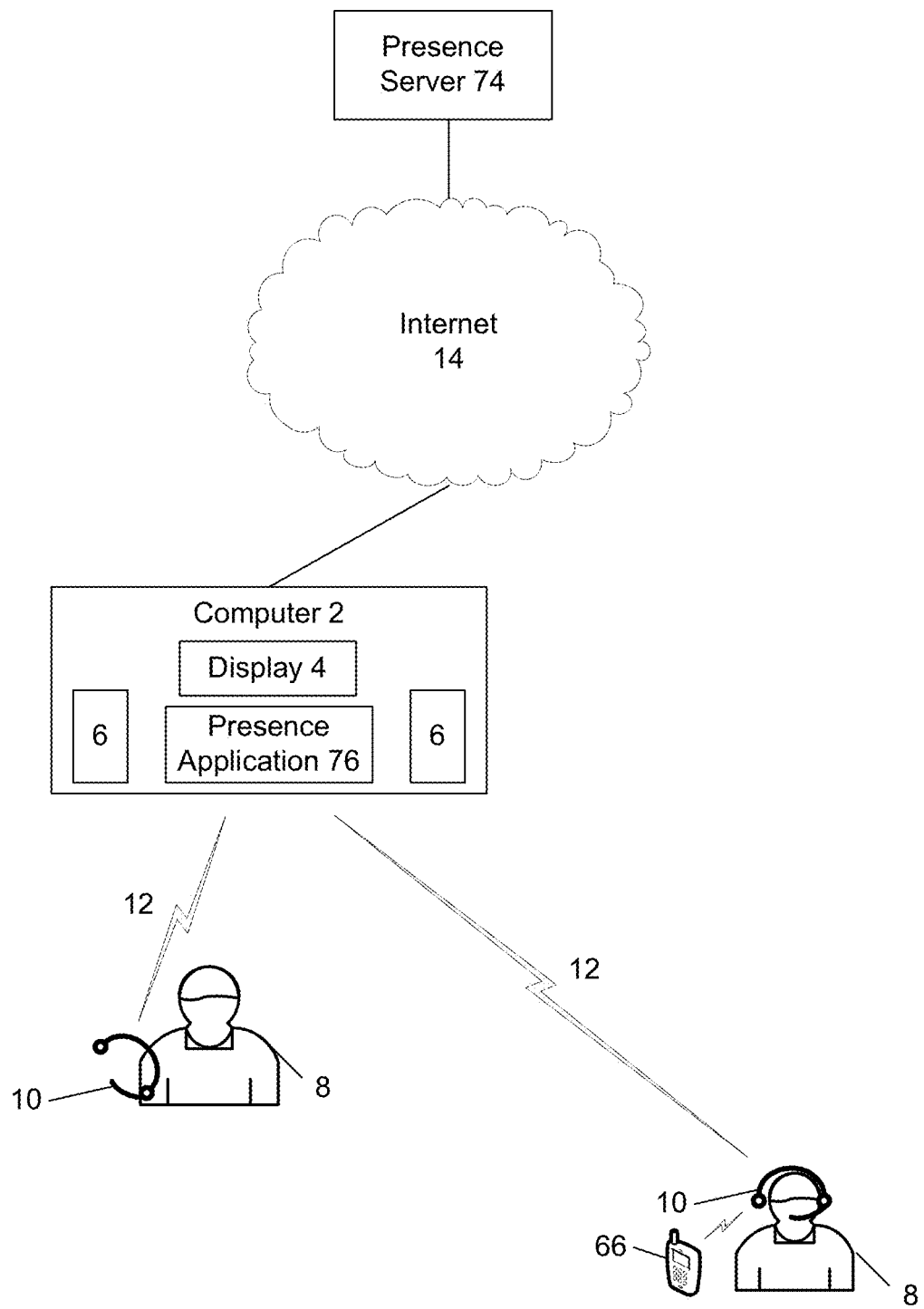
FIG. 9 illustrates a system for presence based telephony call signaling in a further example.

FIG. 9 illustrates a system for presence based telephony call signaling in a further example, whereby a presence server is utilized. The system includes a wireless headset 10 and a computer 2 connected to Internet 14. Computer 2 includes loudspeakers 6 and a display 4. Wireless headset 10 and computer 2 are capable of wireless communications there between over a wireless communication link 12. Similar to FIG. 1, a user 8 may be either wearing wireless headset 10 in a donned position, or the wireless headset 10 may be doffed. User 8 may be located at a varying proximity from computer 2.

In the example shown in FIG. 9, headset 10 relays presence information to a presence application 76 running on computer 2. In one example, headset 10 is paired and operable with a cellular mobile phone 66. The presence application 76 relays the presence information to a presence server 74. In the example shown in FIG. 9, presence server 74 is connected to Internet 14. Presence server 74 may also receive presence information about the user from sources other than computer 2, such as the user's cellular mobile phone 66, a cellular network, a landline telephone network, etc.

When requested by presence application 76, presence server 74 transmits user 8 presence information to computer 2. Although in certain examples described herein the presence information consists of whether headset 10 is donned or doffed and the proximity of headset 10 to computer 2, the presence information can also include whether the user is on a call with the cellular mobile phone 66, a landline phone, or other user information. The presence information at presence server 74 and presence application 76 is used by computer 2 or other applications to derive information regarding the user or determine whether or not the user can be contacted or communicated with, including the best manner to signal an incoming call as described herein.

Figure 10:
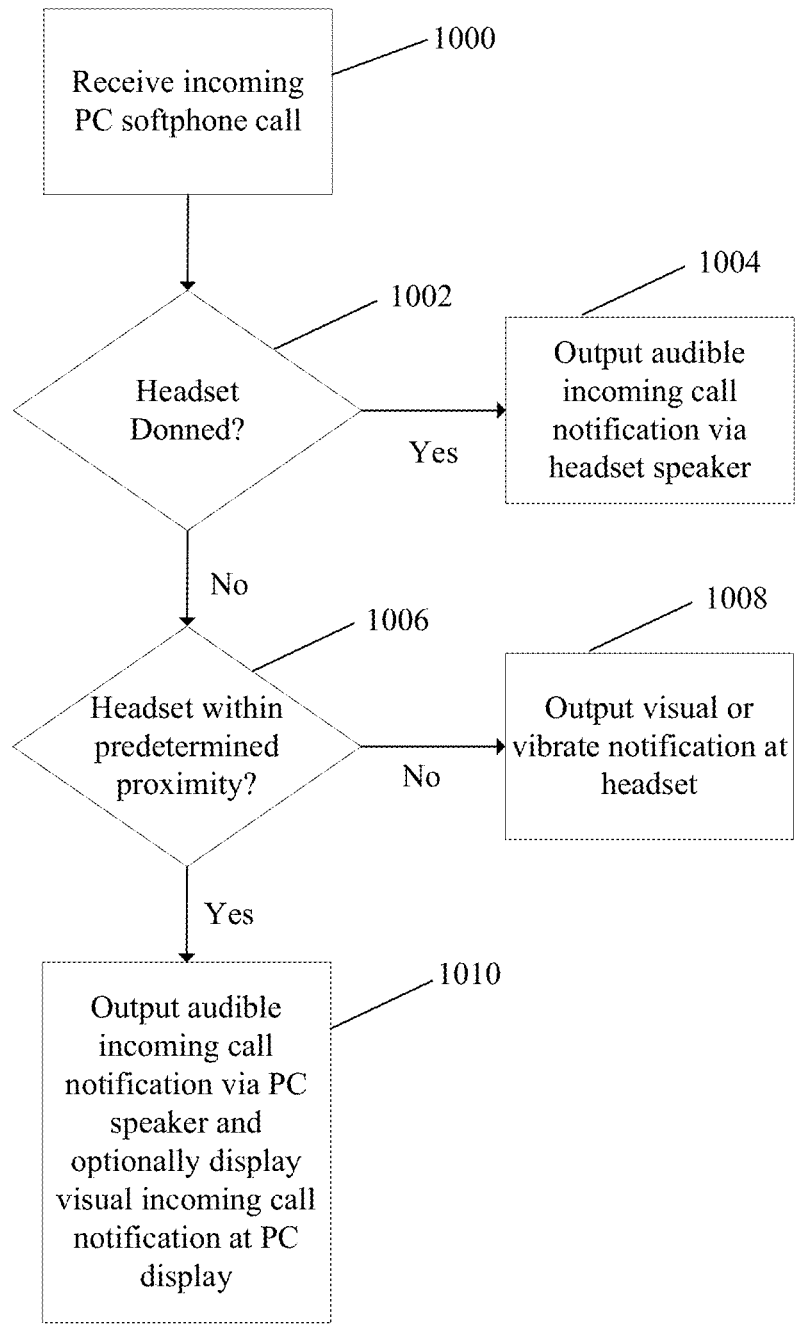
FIG. 10 illustrates a method for presence based telephony call signaling in one example.

FIG. 10 illustrates a method for presence based telephony call signaling in one example. At block 1000, an incoming call is received at a VoIP telephony application in operation at a computer, where the computer includes one or more loudspeakers and a display. At decision block 1002, it is identified or determined whether a wireless headset associated with the computer and operable with the VoIP telephony application is in a donned state. The wireless headset includes a one or more headset speakers and may include an output user interface.

If Yes at decision block 1002, at block 1004 an audible incoming call notification is output via the headset speaker. If No at decision block 1002, at decision block 1006 it is determined whether the headset is within a predetermined proximity. If No at decision block 1006, at block 1008 a visual or vibrate notification is output at a headset output user interface. If Yes at decision block 1006, at block 1010 an audible incoming call notification is output through the computer speaker. A visual incoming call notification may also be output at the computer display. In one example, the audible incoming call notification output at block 1010 through the computer speaker includes spoken caller identification information.

In a further example, if No at decision block 1002, caller identification information is displayed on a headset output user interface in addition to the output at block 1008 or block 1010. For example, the headset output user interface includes a LCD display.

Figure 11A:
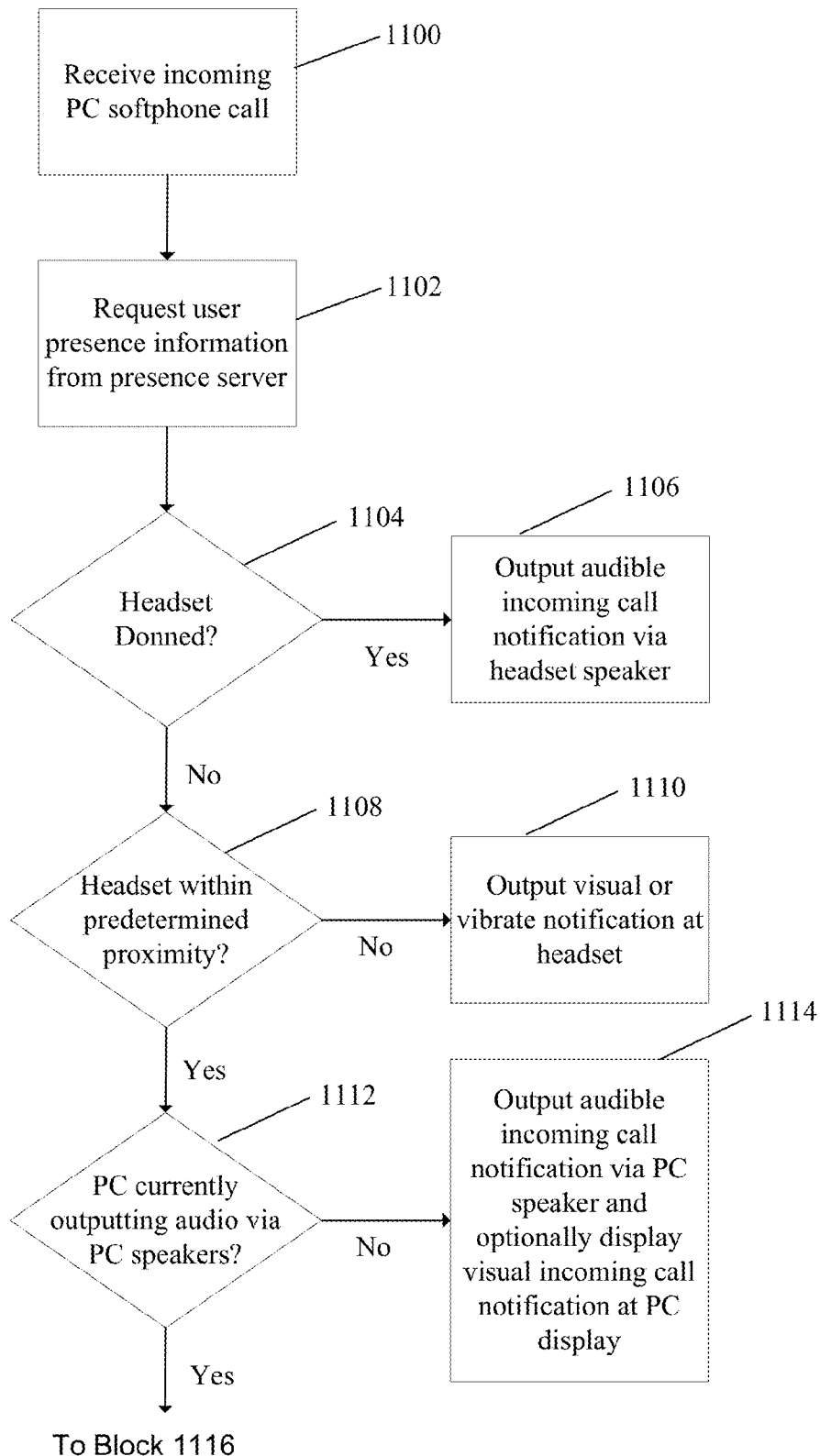
FIGS. 11A and 11B illustrate a method for presence based telephony call signaling in a further example.
Figure 11B:
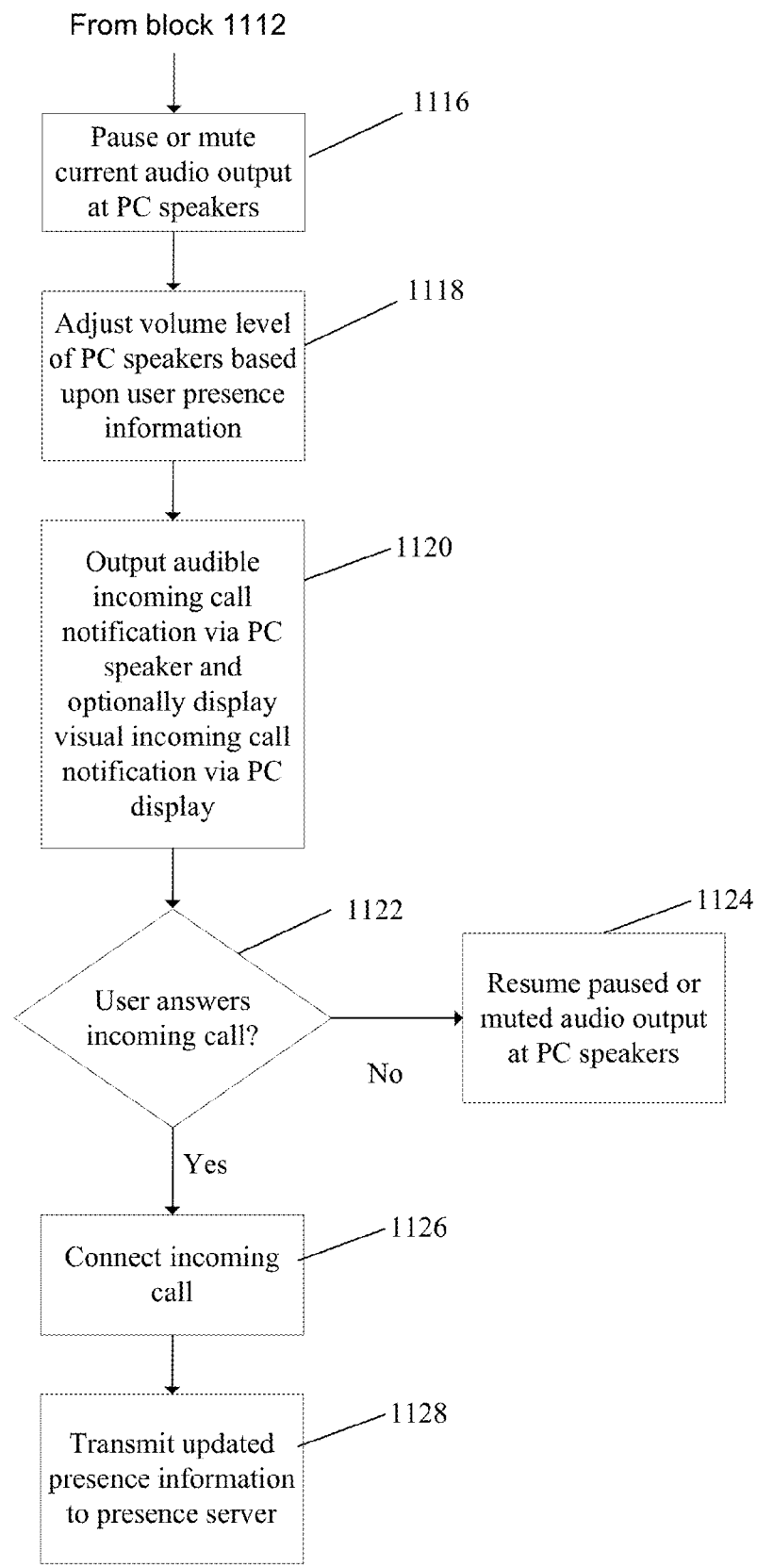

FIGS. 11A and 11B illustrate a method for presence based telephony call signaling in a further example. At block 1100, an incoming call is received at a VoIP telephony application in operation at a computer, where the computer includes one or more loudspeakers and a display. At block 1102 user presence information is requested from a presence server. The user presence information includes, for example, headset proximity information or donned/doffed status of the headset.

At decision block 1104, using the presence information received from the presence server, it is identified whether a wireless headset associated with the computer is in a donned state. The wireless headset includes one or more headset speakers and at least one output user interface.

If Yes at decision block 1104, at block 1106 an audible incoming call notification is output via the headset speaker. If No at decision block 1104, at decision block 1108, using the presence information received from the presence server, it is determined whether the headset is within a predetermined proximity.

If No at decision block 1108, at block 1110 a visual or vibrate notification is output at a headset output user interface. If Yes at decision block 1108, at decision block 1112 it is determined whether the computer is currently outputting audio through the computer speakers. If No at decision block 1112, at block 1114 an audible incoming call notification is output through the computer speakers and a visual incoming call notification may also be displayed at the computer display.

If Yes at decision block 1112, at block 1116 the current audio output at the computer speakers is paused or muted prior to outputting an incoming call notification through the computer speakers. In a further example, the volume level of the current audio output is lowered rather than paused or muted. Whether the current audio is paused or muted may be based upon the particular audio application outputting the current audio or may be based on previously specified user preferences. For example, the audio application may be a media player residing on the computer playing a digital music file residing on the computer, or the audio application may be website providing streaming audio to the computer over the Internet.

At block 1118, the volume level of the PC speakers is adjusted based upon the received user presence information prior to outputting an incoming call notification. For example, the volume level may be adjusted upward or downward based upon a relative further proximity or nearer proximity, respectively. Baseline volume settings and volume level adjustment may also be based on factors such as whether the user is at a work or home environment.

At block 1120 an audible incoming call notification is output through the computer speaker. A visual incoming call notification may also be output at the computer display. At decision block 1122 it is determined whether the user answers the incoming call. If No at decision block 1122, at block 1124 the paused or muted audio output is resumed at the computer speakers. If Yes at decision block 1122, at block 1126 the incoming call is connected. At block 1128 updated presence information is transmitted to the presence server. For example, the updated presence information may indicate the user is currently on a VoIP softphone call.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of wireless communication protocol used between devices, the type of headset or computer, proximity detection techniques, and donned and doffed detectors and techniques. The presence information described herein can be calculated or determined at the headset, the computer, or presence server and transmitted to and from or stored at any of the headset, computer, or presence server. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. One or more non-transitory computer-readable storage media having computer-executable instructions stored thereon which, when executed by one or more computers, cause the one more computers to perform operations comprising:
    receiving an incoming communication at a communication application in operation at a computer, the computer comprising a computer loudspeaker and a computer display;
    identifying a headset donned state or a headset doffed state for a wireless headset associated with the computer, the wireless headset comprising a headset speaker and a headset output user interface;
    determining a headset proximity between the wireless headset and the computer; and
    outputting an incoming communication notification to the headset speaker, the headset output user interface, the computer loudspeaker, or the computer display responsive to identifying the headset donned state or headset doffed state and determining the headset proximity, wherein a volume level of the computer loudspeaker is adjusted responsive to the headset proximity between the wireless headset and the computer prior to outputting an incoming communication notification at the computer loudspeaker.

2. The one or more non-transitory computer readable storage media of claim 1, wherein the incoming communication comprises an incoming call and the communication application is a VoIP telephony application.

3. The one or more non-transitory computer readable storage media of claim 1, wherein the headset output user interface comprises an LED, a vibrate motor, or an interface adapted to signal a vibrate motor coupled to the wireless headset.

4. The one or more non-transitory computer readable storage media claim 1, the operations further comprising displaying communication originator identification information on the headset output user interface responsive to identifying a headset doffed state, wherein the headset output user interface comprises a LCD display.

5. The one or more non-transitory computer readable storage media of claim 1, wherein identifying a headset donned state or a headset doffed state for a wireless headset associated with the computer and determining a proximity between the wireless headset and the computer comprises querying a presence server.

6. The one or more non-transitory computer readable storage media of claim 1, the operations further comprising pausing a current audio playback at the computer loudspeaker or the headset speaker prior to outputting the incoming communication notification to the computer loudspeaker or the headset speaker.

7. A method comprising:
receiving an incoming communication at a communication application in operation at a computer, the computer comprising a computer loudspeaker and a computer display;
identifying a headset donned state or a headset doffed state for a wireless headset associated with the computer, the wireless headset comprising a headset speaker and a headset output user interface;
determining a headset proximity between the wireless headset and the computer; and
outputting an incoming communication notification to the headset speaker, the headset output user interface, the computer loudspeaker, or the computer display responsive to identifying the headset donned state or headset doffed state and determining the headset proximity, wherein a volume level of the computer loudspeaker is adjusted responsive to the headset proximity between the wireless headset and the computer prior to outputting an incoming communication notification at the computer loudspeaker.

8. The method of claim 7, wherein the incoming communication comprises an incoming call and the communication application is a VoIP telephony application.

9. The method of claim 7, wherein the headset output user interface comprises an LED, a vibrate motor, or an interface adapted to signal a vibrate motor coupled to the wireless headset.

10. The method of claim 7, further comprising displaying communication originator identification information on the headset output user interface responsive to identifying a headset doffed state, wherein the headset output user interface comprises a LCD display.

11. The method of claim 7, wherein identifying a headset donned state or a headset doffed state for a wireless headset associated with the computer and determining a proximity between the wireless headset and the computer comprises querying a presence server.

12. The method of claim 7, further comprising pausing a current audio playback at the computer loudspeaker or the headset speaker prior to outputting the incoming communication notification to the computer loudspeaker or the headset speaker.

13. A method comprising:
receiving an incoming communication at a communication application in operation at a computer, the computer comprising a computer loudspeaker and a computer display;
identifying a headset donned state or a headset doffed state for a wireless headset associated with the computer, the wireless headset comprising a headset speaker and a headset output user interface;
determining a headset proximity between the wireless headset and the computer; and
outputting an incoming communication notification to the headset output user interface responsive to identifying a headset doffed state and determining the proximity to be outside a pre-determined range.

14. The method of claim 13, wherein the incoming communication comprises an incoming call.

15. The method of claim 13, wherein the headset output user interface comprises an LED, a vibrate motor, or an interface adapted to signal a vibrate motor coupled to the wireless headset.

16. The method of claim 13, further comprising displaying communication originator identification information on the headset output user interface responsive to identifying a headset doffed state, wherein the headset output user interface comprises a LCD display.

17. The method of claim 13, wherein identifying a headset donned state or a headset doffed state for a wireless headset associated with the computer and determining a proximity between the wireless headset and the computer comprises querying a presence server.

18. The method of claim 13, further comprising pausing a current audio playback at the computer loudspeaker or the headset speaker prior to outputting the incoming communication notification to the computer loudspeaker or the headset speaker.

19. The method of claim 13, further comprising adjusting a volume level of the computer loudspeaker prior to outputting the incoming communication notification.

20. One or more non-transitory computer-readable storage media having computer-executable instructions stored thereon which, when executed by one or more computers, cause the one more computers to perform operations comprising:
receiving an incoming communication at a communication application in operation at a computer, the computer comprising a computer loudspeaker and a computer display;
identifying a headset donned state or a headset doffed state for a wireless headset associated with the computer, the wireless headset comprising a headset speaker and a headset output user interface;
determining a headset proximity between the wireless headset and the computer; and
outputting an incoming communication notification to the headset output user interface responsive to identifying a headset doffed state and determining the proximity to be outside a pre-determined range.

21. The one or more non-transitory computer readable storage media of claim 20, wherein the incoming communication comprises an incoming call.

22. The one or more non-transitory computer readable storage media of claim 20, wherein the headset output user interface comprises an LED, a vibrate motor, or an interface adapted to signal a vibrate motor coupled to the wireless headset.

23. The one or more non-transitory computer readable storage media of claim 20, the operations further comprising displaying communication originator identification information on the headset output user interface responsive to identifying a headset doffed state, wherein the headset output user interface comprises a LCD display.

24. The one or more non-transitory computer readable storage media of claim 20, wherein identifying a headset donned state or a headset doffed state for a wireless headset associated with the computer and determining a proximity between the wireless headset and the computer comprises querying a presence server.

25. The one or more non-transitory computer readable storage media of claim 20, the operations further comprising pausing a current audio playback at the computer loudspeaker or the headset speaker prior to outputting the incoming communication notification to the computer loudspeaker or the headset speaker.

26. The one or more non-transitory computer readable storage media of claim 20, the operations further comprising adjusting a volume level of the computer loudspeaker prior to outputting the incoming communication notification.

* * * * *